United States Patent
Bosch-Collado et al.

(10) Patent No.: US 12,071,922 B2
(45) Date of Patent: Aug. 27, 2024

(54) WIND TURBINE BLADE ASSEMBLY AND METHODS

(71) Applicant: General Electric Renovables Espana, S.L., Barcelona (ES)

(72) Inventors: Josep Bosch-Collado, Barcelona (ES); Przemyslaw Skierczynski, Warsaw (PL); Javier Bescos Grillo, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/350,804

(22) Filed: Jul. 12, 2023

(65) Prior Publication Data

US 2023/0366371 A1 Nov. 16, 2023

Related U.S. Application Data

(62) Division of application No. 17/741,772, filed on May 11, 2022, now Pat. No. 11,732,685.

(30) Foreign Application Priority Data

Jul. 12, 2021 (EP) .................................. 21382629

(51) Int. Cl.
F03D 1/06 (2006.01)

(52) U.S. Cl.
CPC ...... F03D 1/0658 (2013.01); *F05B 2260/301* (2013.01)

(58) Field of Classification Search
CPC .... F03D 1/0658; F03D 1/0683; F03D 1/0675; F03D 1/0691; F03D 1/066; F05B 2260/301
See application file for complete search history.

(56) References Cited

U.S. PATENT DOCUMENTS

| | | | | |
|---|---|---|---|---|
| 4,412,784 A | * | 11/1983 | Wackerle | F03D 1/0658 416/241 A |
| 4,915,590 A | * | 4/1990 | Eckland | F03D 1/0658 403/267 |
| 8,133,029 B2 | | 3/2012 | Quell et al. | |
| 9,909,561 B2 | | 3/2018 | Gil Mollà et al. | |
| 11,067,056 B2 | * | 7/2021 | Jacobsen | F03D 1/0675 |
| 11,167,507 B2 | * | 11/2021 | Walker | B29C 70/48 |
| 11,319,922 B2 | * | 5/2022 | Bech | F03D 1/0658 |
| 11,408,392 B2 | | 8/2022 | Smith et al. | |
| 2010/0084079 A1 | * | 4/2010 | Hayden | B29C 70/86 156/189 |
| 2011/0044817 A1 | | 2/2011 | Bendel et al. | |
| 2016/0290313 A1 | * | 10/2016 | Zwart | F03D 1/0658 |
| 2017/0045032 A1 | | 2/2017 | Jacobsen et al. | |
| 2017/0362945 A1 | | 12/2017 | Feigl | |
| 2022/0307463 A1 | | 9/2022 | Rasmussen et al. | |

FOREIGN PATENT DOCUMENTS

| | | |
|---|---|---|
| EP | 2677166 B1 | 8/2015 |
| EP | 2674612 B1 | 10/2016 |
| EP | 3561292 A1 | 10/2019 |

* cited by examiner

*Primary Examiner* — Sang K Kim
(74) *Attorney, Agent, or Firm* — Dority & Manning, P.A.

(57) ABSTRACT

The present invention discloses a blade root assembly for a wind turbine, the assembly comprising a blade with a root portion and a blade root flange. The blade root portion comprising a plurality of receptacles configured to receive fasteners to couple the blade root portion with a wind turbine rotor hub.

10 Claims, 7 Drawing Sheets

WIND TURBINE BLADE ASSEMBLY AND METHODS

This application is a divisional of and claims priority to U.S. application Ser. No. 17/741,772, having a filing date of May 11, 2022. This application is incorporated herein by reference in its entirety.

FIELD

The present disclosure relates to a wind turbine blade assembly and methods for providing a wind turbine blade assembly, and more particularly to a wind turbine blade assembly comprising a blade root flange.

BACKGROUND

Wind turbines are broadly used to convert wind power into electricity. The generated electricity can be supplied to an electrical grid and directed consumers. Wind turbines generally comprise a tower on top of which a nacelle is mounted. A rotor comprising a rotor hub and a plurality of blades are generally mounted in said nacelle, defining a rotatable coupling between rotor and nacelle. The plurality of blades use the wind generated aerodynamic forces to produce a net positive torque on a rotating shaft, resulting in the production of mechanical power, which is later transformed to electricity in a generator.

The blades might be directly connected to the rotor hub or might be connected through a pitch bearing. A pitch system can rotate a blade along its longitudinal axis, allowing modification of the angle of attack of the wind turbine blade with respect to the incoming air flow. The aerodynamic forces acting on the blade can thereby be controlled.

Wind turbines have evolved rapidly over the last decades with a clear trend of increasing size. The power generated by a wind turbine is proportional to the rotor swept area and, therefore to the square of the blade length. Thus, higher towers and longer blades have been implemented with the goal of extracting more energy from the wind, leading to a higher electricity production. The increase in size over the years has led to a substantial increase in the loads acting on wind turbine components, and has posed new challenges for a wide range of disciplines including mechanical, electrical, materials and civil engineering among others.

Typically, the blades are made from composite materials, i.e., reinforcing fibers which can be bonded to one another with a resin and cured to solidification. Composite materials such as glass fiber-epoxy, or other combinations, reduce the overall weight of the blade, however they may not have the structural integrity to provide a secure fixing mechanism to the rotor hub, wherein fasteners, for example, bolts, might be directly coupled. Thus, wind turbine blades generally comprise metal inserts, receptacles or bushing which are embedded in the blade root in a direction parallel to a longitudinal axis of the blade. These inserts can be combined with fasteners such as studs, bolts or rods to achieve a secure connection between the rotor hub (or pitch bearing) and the blade. However, to facilitate the wind turbine blade mounting process to the rotor hub, it is of great importance to maintain the blade root portion circular, matching the geometry of the rotor hub counterpart where the blade root will be connected.

During the manufacturing process of a composite blade of a wind turbine, it is common practice to manufacture the complete blade in a single moulding step or to join two halves together and remove them from the mould relatively quickly. Under these circumstances, the resin may not be fully cured when the blade is taken from the mould, and the resulting blade can still be relatively soft. Further, before the blade is installed in the wind turbine there are other factors that might alter the final geometry of the same. Composite materials show a shrinking behavior during curing, and long period of blade storage leads to large and sustained forces acting on the blade due to the blade's own weight. In fact, it has been found that the weight force of the blade itself acting on the blade root portion can lead to an ovalization of the circular blade root mounting surface.

Said potential deformation of the blade, and more precisely of the blade root portion, can hinder the blade mounting process extending it in time. Further, the blade root ovalization might also result in a less secure connection to the rotor hub, wherein certain fasteners might not be completely aligned with a direction parallel to a longitudinal axis of the blade.

The present disclosure provides methods and systems to at least partially overcome some of the aforementioned drawbacks.

SUMMARY

In an aspect of the present disclosure, a blade assembly for a wind turbine is provided. The wind turbine blade assembly comprising a blade including a blade root portion and a blade root flange, wherein the blade root portion comprises a plurality of receptacles embedded in the blade root portion. The receptacles are configured to receive hub fasteners to couple the blade root portion to a rotor hub and the blade root flange is coupled to the blade root portion through the receptacles.

According to this aspect, the fact that the blade root flange is coupled to the blade root portion through the same receptacles suitable to receive the hub fasteners allows a compact blade root design with a reduced thickness of the blade root portion. The reduction in thickness of the blade root portion as compared with alternatives can reduce the weight of the blade. As has been previously discussed, a reduction in weight represents a reduction of the forces acting on the blade due to its own weight, which have been found to have a considerable impact on the blade deformation and blade root ovalization during storage.

Further, in this way the connection between the flange and the blade root is aligned with the same locations where the hub fasteners will be later introduced and therefore misalignment issues while mounting the blade to the rotor hub can be reduced considerably.

In a further aspect of the present disclosure, a wind turbine blade assembly is provided; the assembly comprising a blade including a blade root portion, a blade root flange, and a plurality of fasteners for connecting the blade root flange to the blade root portion, wherein the blade root portion comprises a plurality of receptacles embedded in the blade root portion. The receptacles being configured to receive the fasteners to connect the blade root flange with the blade root portion.

In an additional aspect, a method for providing a wind turbine assembly is provided. The method comprising providing a blade root flange, providing a wind turbine blade made of a fiber reinforced composite material with a plurality of embedded receptacles in a root portion of the blade, positioning the blade root flange against the root portion of the blade, and coupling one or more flange fasteners to the receptacles to couple the blade root flange to the wind turbine blade.

According to this additional aspect, this method enables to couple a flange to a blade root without further perforating the blade root portion using metric bolts as is known in the art. Further, it provides direct alignment between the blade root flange and the embedded receptacles which will later receive hub fasteners.

Additional object, advantages and features of embodiments of the invention will become apparent to those skilled in the art upon examination of the description, or may be learned by practice of the invention.

Throughout the present disclosure, and with respect to the various examples disclosed herein, it should be noted that that the hub fasteners might couple the blade root portion directly to a rotor hub, to rotor hub extenders, to pitch bearings or to any other element of the rotor hub. I.e. the present disclosure aims to encompass both direct blade to hub connections as well as indirect blade to hub connections through one or more further components.

DETAILED DESCRIPTION OF EXAMPLES

Figure 1:
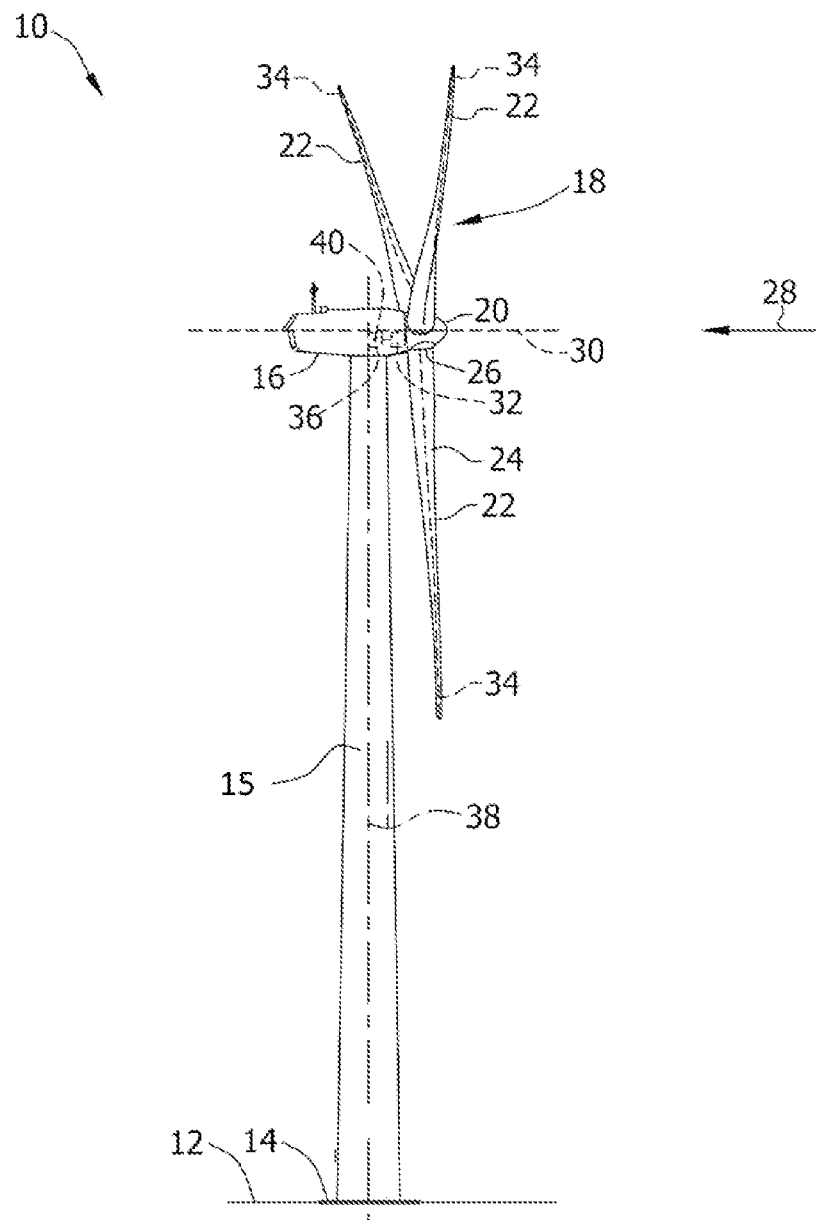
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2$m$, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
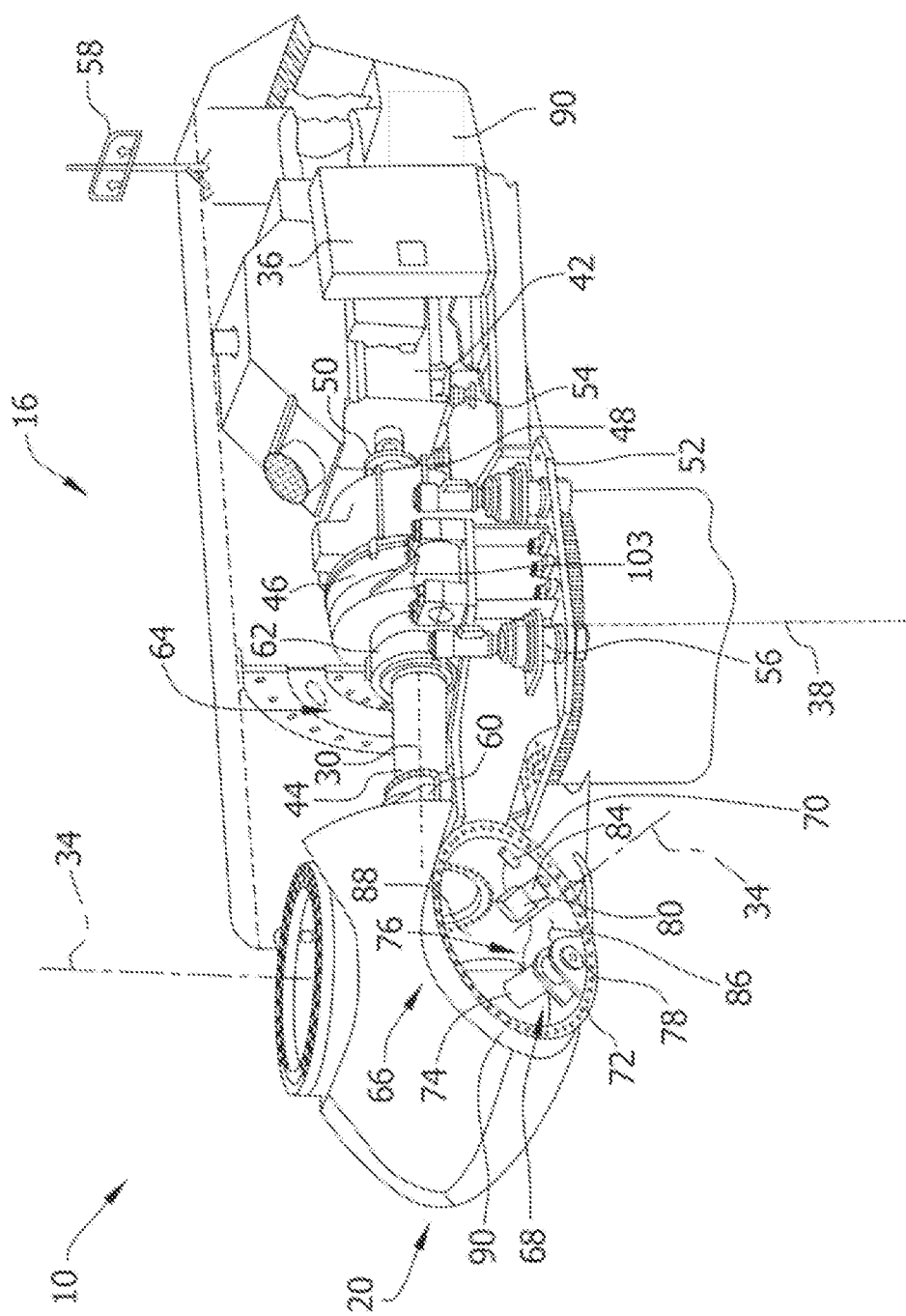
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
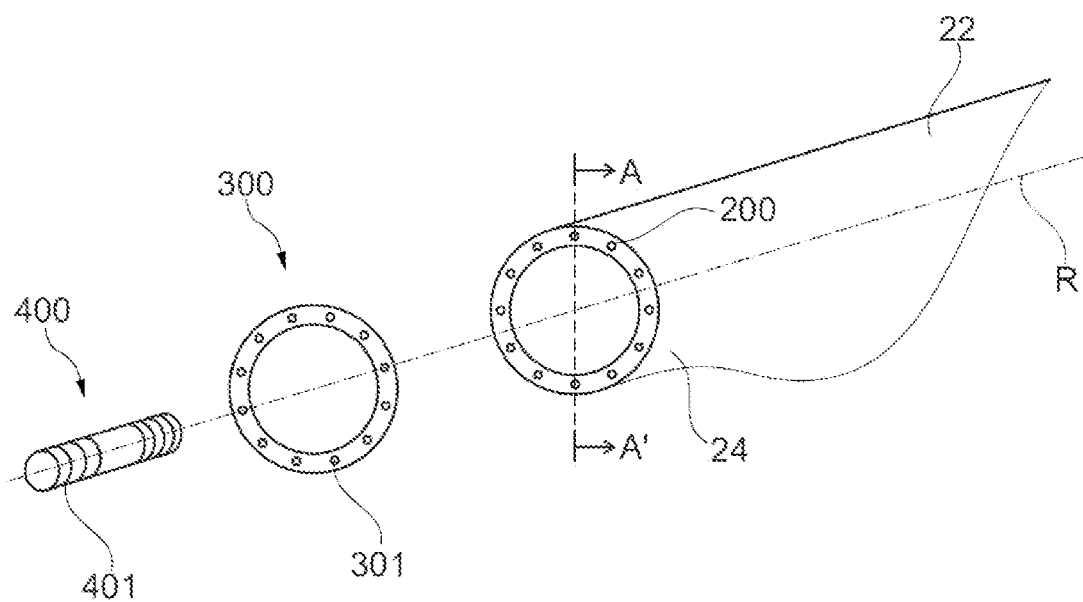
FIG. 3 schematically illustrates an exploded view of an example of a wind turbine blade assembly.

FIG. 3 is an exploded schematical view of an example of a wind turbine blade assembly. FIG. 3 shows a wind turbine blade 22 including a blade root portion 24 wherein a plurality of receptacles 200 are located. In accordance with an aspect of the present disclosure, a wind turbine blade assembly is provided. The wind turbine blade assembly comprises a blade 22 including a blade root portion 24 and a blade root flange 300. The blade root portion 24 comprises a plurality of receptacles 200 embedded in the blade root portion, the receptacles being configured to receive hub fasteners 400 to couple the blade root portion 24 to a rotor hub. The blade root flange 300 is coupled to the blade root portion 24 through the receptacles 200.

In this example, the receptables 200 embedded in the blade root portion are first bushings. Further, in this example, the bushings 200 are distributed with radial symmetry around the blade root portion 24. The receptacles 200 may extend substantially parallel to the pitch axis R of the blade 22. The bushings 200, as shown in this example, may be or include e.g. threaded bushings, helical bushings, mold-in bushings, press fit bushings or potted bushings among other type of receptacles.

Further, in the example of FIG. 3 the blade root flange 300 is in the form of an annular flange. Through holes 301 may be distributed at the same spacing apart as the receptacles 200 in the blade root.

In other examples, blade root flanges with other geometries such as a circular flange may be used. The illustrated configuration of receptacles 200 and through holes 301 allows a hub fastener 400 to pass through a through hole 301 and couple a part of the hub with the blade root portion 24 through the receptacles 200. The hub fastener 400 illustrated in this figure is a stud bolt comprising a threaded surface at each end, but other fasteners may be used as well.

Figure 4:
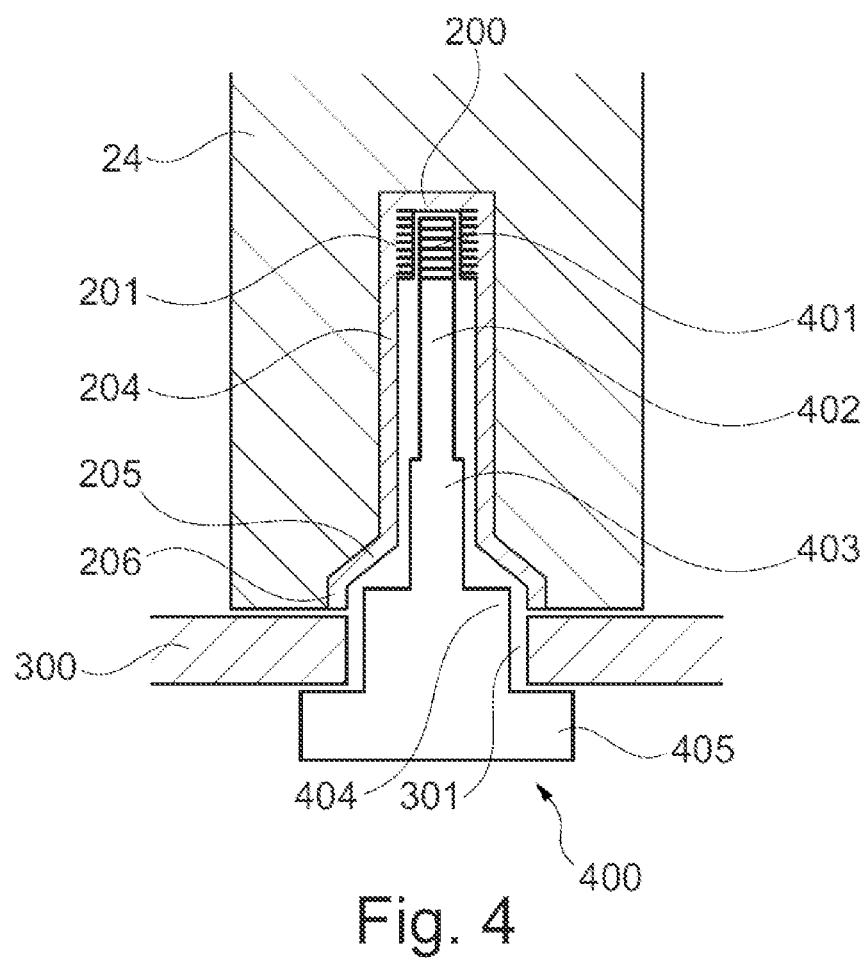
FIG. 4 schematically illustrates a detail view of a cross section of the wind turbine blade assembly of FIG. 3 but comprising a different fastener through the plane A-A'.

FIG. 4 is a partial cross-sectional view of the example assembly illustrated in FIG. 3 across the plane A-A' but comprising a different fastener 400. In the example in FIG. 4 a threaded bolt 400 is used as a fastener for attaching the flange 300 the blade root portion 24. This figure shows a detailed view of the receptacle 200 embedded in the blade root portion 24.

The blade root portion 24 might be made of a composite material with fiber embedded in resin and the receptacles 200 might be embedded in the fiber during blade moulding. Alternatively, the receptacles 200 can be inserted in the blade root portion 24 after moulding, applying mechanical techniques known in the art.

The cross-sectional view in FIG. 4 shows that the receptacles 200 are bushings comprising an external smooth face, however this is merely an illustrative example and other types of receptacles such as bushing in which the external surface comprises grooves and/or is serrated or threaded are also possible. External surfaces with different finishes might provide a greater contact area than a smooth face, increasing the relative coupling and friction between the composite material and the receptacle.

Further, FIG. 4 also shows that the receptacles 200 are threaded first bushings comprising an inner surface with a first inner thread 201. The inner thread 201 might be formed along the entire length of the receptacle's inner surface. Alternatively, the first inner thread 201 might be formed on a specific location of the inner surface, as currently shown in FIG. 4. In the present example in FIG. 4, the receptacle 200 further comprises a central section 204 of greater diameter than the inner thread 201 and a proximal section 205 wherein the inner diameter of the receptacle increases up to the mouth 206 of the receptacle. The proximal portion of mouth 206 is shown to be of constant diameter.

In the example shown in FIG. 4, the flange 300 has a through hole 301 coincident with the receptacle 200 which is at least of the same diameter as the first inner thread 201. In the current example the through hole 301 has substantially the same diameter as the mouth 206 of the receptacle but other dimensions may be also used. Further, the example shows a threaded bolt 400 as fastener comprising a first thread 401 matching the first inner thread 201 of the receptacle 200, a central section 402 of substantially the same diameter as the first thread 401, and two consecutive sections 403, 404 of substantially the same diameter as the central section 204 and mouth 206 of the receptacle, respectively. Further, the threaded bolt 400 comprises a head 405 which exerts pressure on the flange 300 when the fastener 400 is coupled to receptacle 200. The disclosed arrangement of internal diameters of the receptacle 200 and the respective changes in outer diameter of the fastener 400 might aid the alignment of the fastener during assembly. However, other receptacles with different internal geometries as well as fasteners with different external geometries may be also used. Additionally, the fastener 400 might not necessarily match the rotor hub counterpart.

As shown in FIG. 4, the wind turbine blade assembly may comprise a flange fastener to attach the blade root flange to the blade root portion. The flange fastener may also include a thread which matches the first inner thread 201 of the receptacles 200 or threaded first bushings. This would allow using existing receptacles in the blade root portion to fasten the flange but could imply that the flange fasteners, in case they are not adapted to be coupled with a rotor hub (or pitch bearing), might need to be removed prior to installing the blade assembly to the rotor hub to introduce the rotor studs into the receptacles.

Figure 5:
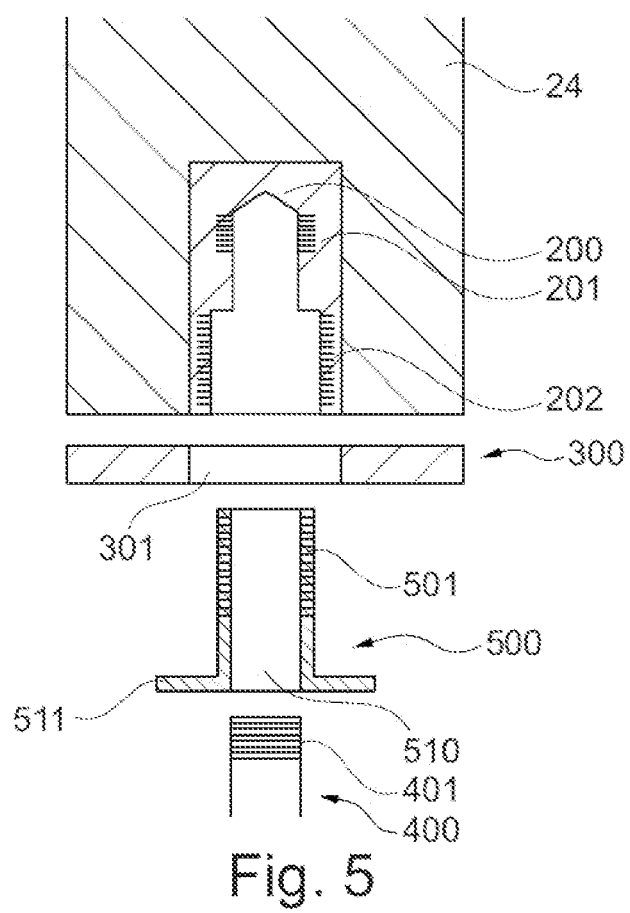
FIG. 5 schematically illustrates a detail exploded view of a cross section of another example of the wind turbine blade assembly through the plane A-A'.

FIG. 5 is an exploded schematical cross-sectional view of another example of a wind turbine blade assembly. FIG. 5 shows a wind turbine blade assembly comprising a blade including a blade root portion 24, a blade root flange 300 and a fastener 500 for connecting the blade root flange 300 to the blade root portion 24, wherein the blade root portion 24 comprises a plurality of receptacles 200 embedded in the blade root portion 24. The receptacles 200 in FIG. 5 are configured to receive the fasteners 500, 400 to connect the blade root flange 300 with the blade root portion 24.

In FIG. 5, the receptacle 200 is a threaded first bushing comprising a first inner thread 201 and an additional second inner thread 202. The second inner thread 202 is of greater diameter than the first inner thread 201. The second inner thread 202 is located closer to the root of the blade than the first inner thread. In this example, the wind turbine blade assembly further comprises a flange fastener 500, which is a second bushing comprising an outer thread 501 that matches the second inner thread 202 of the receptacle 200 or threaded first bushing. The flange fastener 500 can thus mate with the receptacle 200 and fix the flange to the blade root. The flange fastener 500 may be a hollow bushing with a through hole to at least the same size as the first inner thread 201 of the threaded first bushings 200.

In the illustrated example, the flange fastener 500 may have a flange 511 configured to exert pressure on the flange 300 when the fastener 500 is coupled to bushing 200.

Further, the flange fastener 500 also comprises a through hole 510 of at least the same diameter as the first inner thread 201 of the bushing 200. The size of the through hole allows a hub fastener (or any other fastener) to go through and be threaded on the first inner thread 201 of the receptacle 200 without the need of unfastening the flange fastener 500.

Although in the example of FIG. 5 the geometric transition in between the first and second inner threads 201, 202 has been exemplified as a sharp change in inner diameter, other internal geometries are also possible, such as a tapered edge providing a progressive change in diameter or a smooth curved transition.

Figure 6:
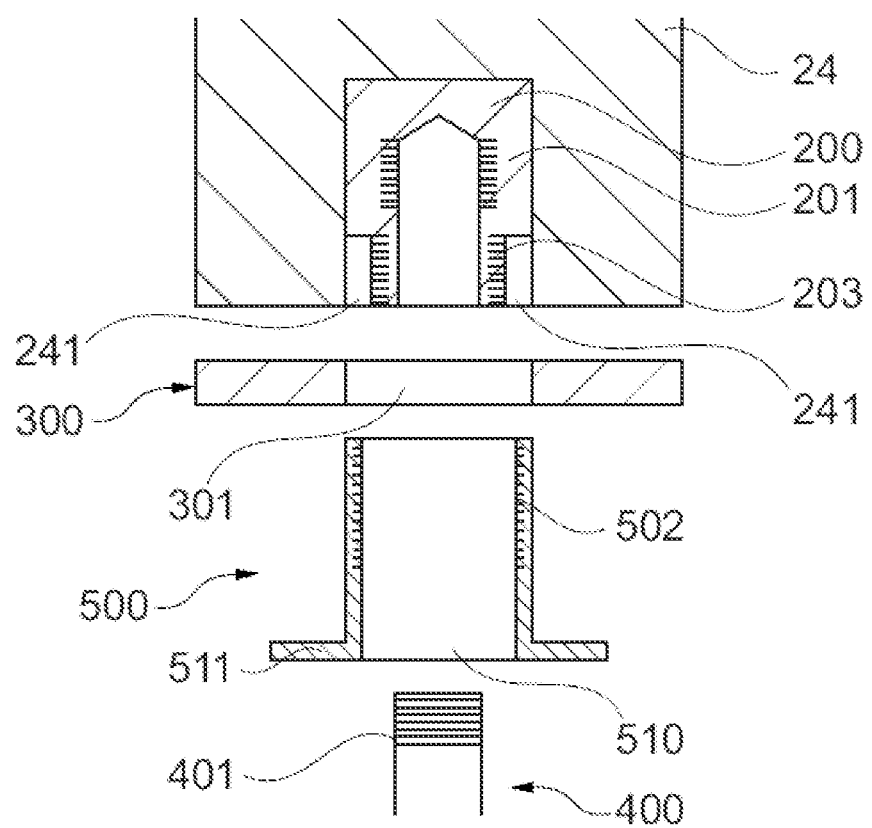
FIG. 6 schematically illustrates a detail exploded view of a cross section of yet another example of the wind turbine blade assembly through the plane A-A'.

FIG. 6 is an exploded schematical view of yet another example of a wind turbine blade assembly. In the example of FIG. 6, the receptacle or first bushing 200 embedded in the blade root portion 24 comprises a first inner thread 201 and a first outer thread 203 of greater diameter than the first inner thread 201. The figure shows that whereas the external surface of the bushing 200 around the first inner thread 201 is in direct contact with the fiber of the blade root portion 24, there is a gap 241 between the first outer thread 203 and the inner walls of the fiber. This gap, which surrounds the bushing 200 is intended to accommodate the flange fastener 500. Thus, the present example depicts a flange fastener or second hollow bushing 500 including an inner thread 502 which matches the first outer thread 203 of the threaded first bushing 200 and a through hole 510 of at least the same size as the first inner thread 201 of the threaded first bushing 200.

FIG. 6 also shows a hub fastener 400 with a smaller diameter than the through hole 510 of the flange fastener 500 to pass through the assembly and couple the flange 300 with the blade root portion 24.

In an aspect of the disclosure, a wind turbine rotor assembly comprising a rotor hub 20, and a plurality of the wind turbine blade assemblies according to any of the aforementioned examples is provided.

Figure 7:
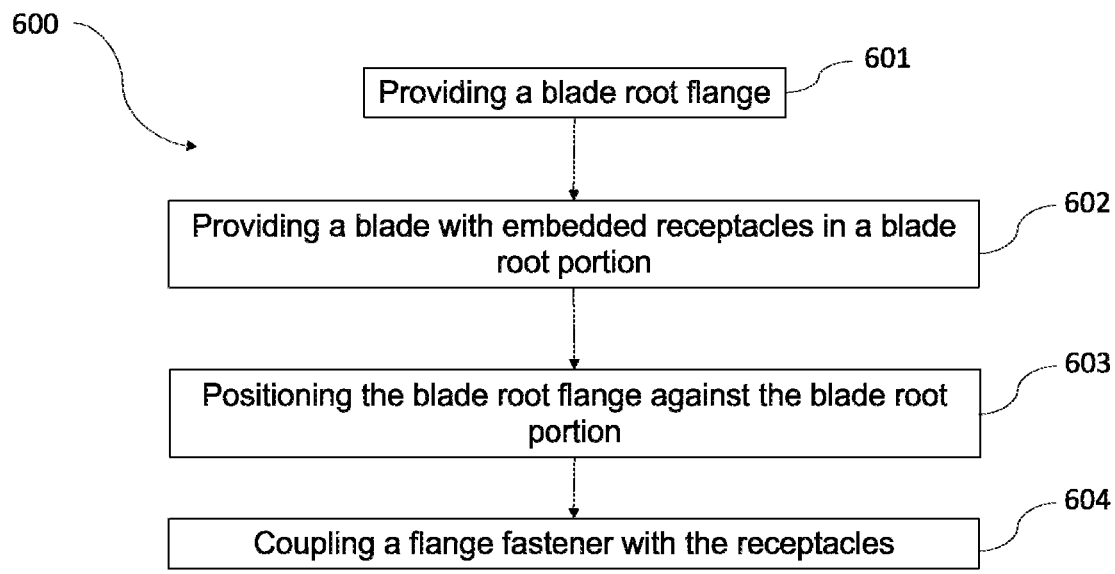
FIG. 7 schematically illustrates a flowchart of an example of a method for providing a wind turbine blade assembly.

In another aspect of the disclosure, a method 600 is provided. Method 600 is suitable for providing a wind turbine blade assembly. Method 600 is schematically illustrated in FIG. 7.

The method comprises, at block 601, providing a blade root flange 300. The blade root flange might have a variety of morphologies, as for example an annular or a circular shape. Thus, the blade root flange 300 might be an annular or circular flange. The method 600 also comprises, at block 602, providing a wind turbine blade 22 made of a fibre reinforced composite material with a plurality of embedded receptacles 200 in a root portion 24 of the blade 22. The embedded receptables 200 might be simple sleeves, threaded bushings, helical bushings, mold-in bushings, press fit bushings, potted bushings or other type of receptacles. The method 600, at block 603, comprises positioning the blade root flange 300 against the root portion 24 of the blade 22. And, at block 604, one or more fasteners 400, 500 may be coupled to the receptacles 200 to attach the blade root flange 300 to the wind turbine blade 24.

In examples, the method 600 for providing a blade root assembly may comprise providing threaded bushing as receptacles 200 with at least an inner thread 201, and fasteners 400 with an outer thread 401. The fasteners 400 provided, as seen in FIG. 4, may later on be replaced for hub fasteners during mounting the wind turbine blade assembly to a rotor hub.

Further, the method 600 may also comprise the steps of elevating the blade assembly uptower to the rotor hub on top of the wind turbine tower, aligning the blade assembly with a rotor hub 20, unfastening one or more of the fasteners, and attaching the blade assembly to the rotor hub by introducing one or more rotor studs into the receptacles 200. As discussed, the connection between the blade assembly and the rotor hub can be either a direct connection or through other wind turbine components such as pitch bearings 72, extenders or others.

In this aspect, the method 600 may alternatively further comprise elevating the blade assembly uptower to the rotor hub on top of the wind turbine tower, aligning the blade assembly with a rotor hub 20, and attaching the blade assembly to the rotor hub 20 by introducing one or more rotor studs 400 into the receptacles 200 without removing the flange fasteners 500, as seen in FIGS. 5 and 6. The embedded receptacles 200 provided for this example might include threaded bushings with a first inner thread 201 and a second inner thread 202 of greater diameter than the first inner thread 201, and the flange fasteners 500 provided may include threaded bushings with an outer thread 501 matching the second inner thread 202 of the receptacles 200 and a through hole 510 of at least the same diameter of the first inner thread 201 of the receptacle 200 so that a rotor stud 400 can pass through the flange fastener 500.

The aforementioned method 600, in another example, may further comprise elevating the blade assembly uptower to the rotor hub on top of the wind turbine tower, aligning the blade assembly with a rotor hub 20, and attaching the blade assembly to the rotor hub 20 by introducing one or more rotor studs 400 into the receptacles 200, wherein the embedded receptacles 200 provided include threaded bushings with a first inner thread 201 and a first outer thread 203 of greater diameter than the first inner thread 201, and the flange fasteners 500 provided include threaded bushings with an inner thread 501 matching the first outer thread 203 of the receptacles 200 and a through hole 510 of at least the same diameter as the first inner thread 201 of the receptacle 200 so that a rotor stud 400 can pass through the flange fastener 500. As previously stated, and as for all examples provided herein, the connection between the blade assembly and the rotor hub 20 can be either a direct connection or through other wind turbine components such as pitch bearings 72, extenders or others.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A wind turbine blade assembly, comprising:
   a blade with a blade root portion;
   a blade root flange comprising a through hole;
   a plurality of receptacles embedded in the blade root portion, the plurality of receptacles configured to receive hub fasteners to couple the blade root portion to a rotor hub, the plurality of receptacles comprising, at least, a first receptacle, the hub fasteners comprising, at least, a threaded hub fastener comprising a first thread matching a first inner thread of the first receptacle, a central section of the same diameter as the first thread, and two consecutive sections of a greater diameter than the central section, wherein the blade root flange is coupled to the blade root portion through the plurality of receptacles, and wherein the threaded fastener comprises a head that exerts pressure on the blade root flange when the threaded hub fastener is coupled to first receptacle.

2. The wind turbine blade assembly of claim 1, wherein a diameter of the through hole is greater than a diameter of the first inner thread.

3. The wind turbine blade assembly of claim 1, wherein the through hole has the same diameter as the mouth of the first receptacle.

4. The wind turbine blade assembly of claim 1, wherein the blade root flange is an annular flange.

5. The wind turbine blade assembly of claim 1, wherein the blade root flange is a circular plate.

6. The wind turbine blade assembly of claim 1, wherein one or more of the plurality of receptacles embedded in the blade root portion are first bushings.

7. A wind turbine rotor assembly, comprising:
a rotor hub; and
a plurality of the wind turbine blade assemblies according to claim 1.

8. A method, comprising:
providing a blade root flange;
providing a wind turbine blade made of a fiber reinforced composite material with a plurality of receptacles embedded in a root portion of the wind turbine blade;
positioning the blade root flange against the root portion of the wind turbine blade; and
coupling one or more hub fasteners to the plurality of receptacles to attach the blade root flange to the wind turbine blade, wherein the plurality of receptacles comprise, at least, a first receptacle having a first inner thread, the hub fasteners comprising, at least, a threaded hub fastener having a first thread matching the first inner thread of the first receptacle, a central section of the same diameter as the first thread, and two consecutive sections of a greater diameter than the central section, and wherein the threaded fastener comprises a head that exerts pressure on the blade root flange when the threaded hub fastener is coupled to first receptacle.

9. The method of claim 8, wherein the first receptacle is a threaded bushing with the first inner thread.

10. The method of claim 8, further comprising:
elevating the wind turbine blade uptower;
aligning the wind turbine blade with a rotor hub;
unfastening one or more of the hub fasteners; and
attaching the wind turbine blade to the rotor hub by introducing one or more rotor studs into the plurality of receptacles.

* * * * *